Dec. 16, 1952 W. P. MOGRIDGE 2,621,340
SPRING ASSEMBLY
Filed Feb. 16, 1949 3 Sheets-Sheet 1

Inventor
WILLIAM P. MOGRIDGE
By Weatherford & Weatherford
Attorneys

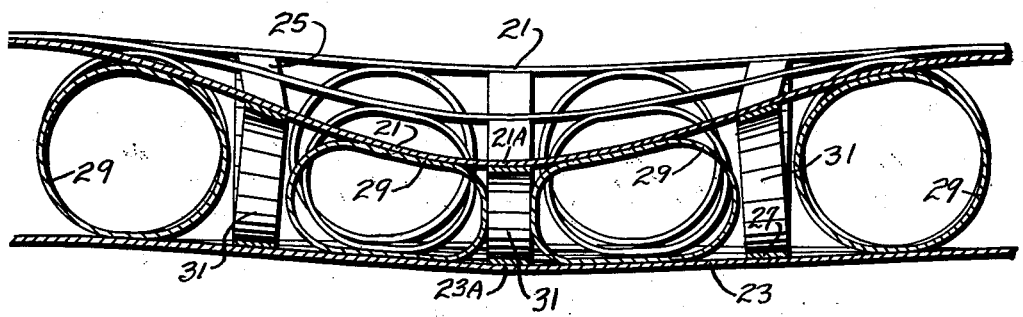
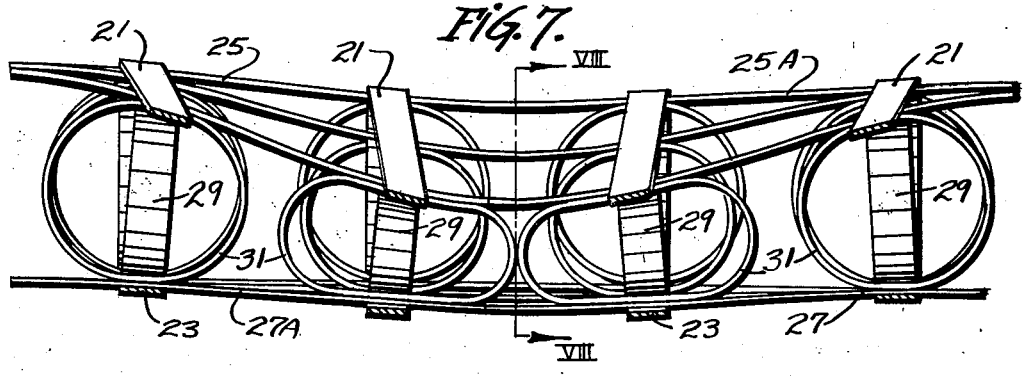
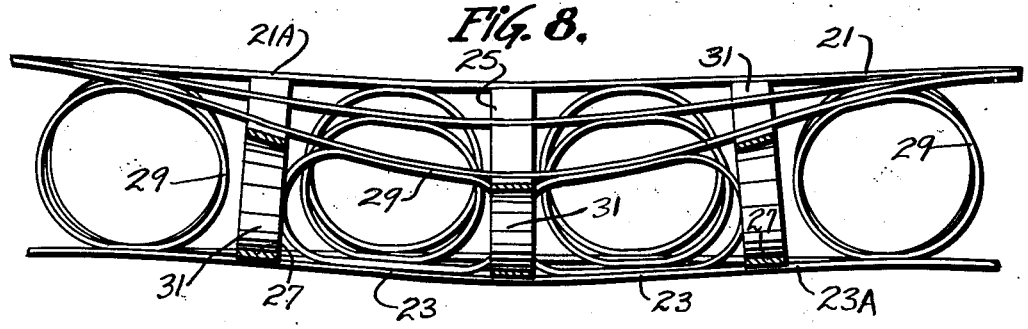

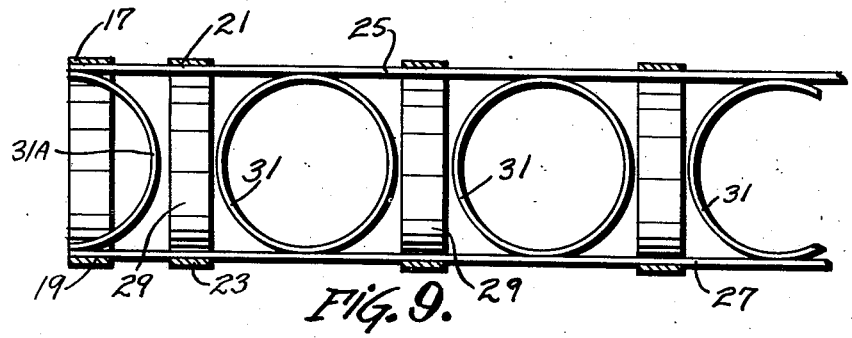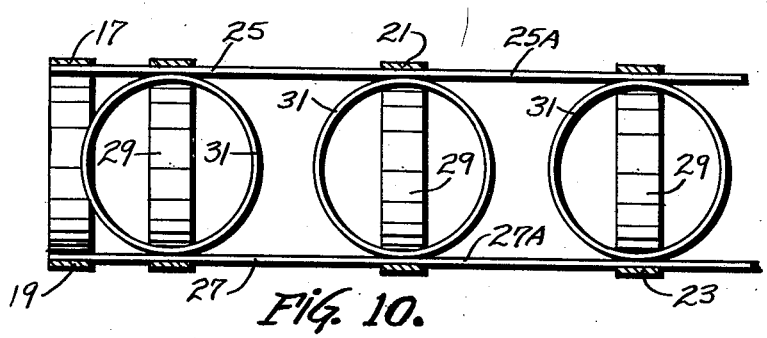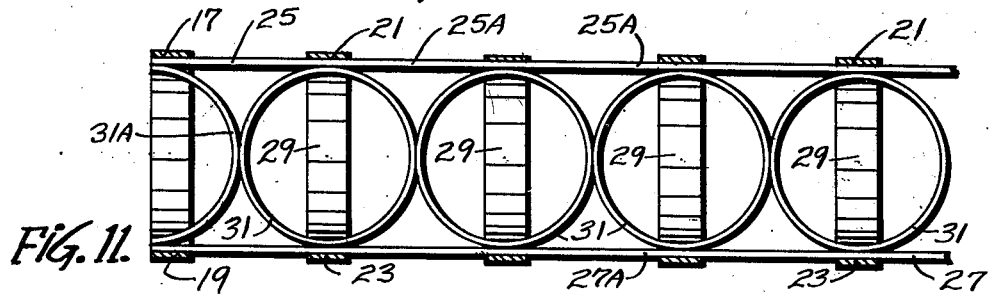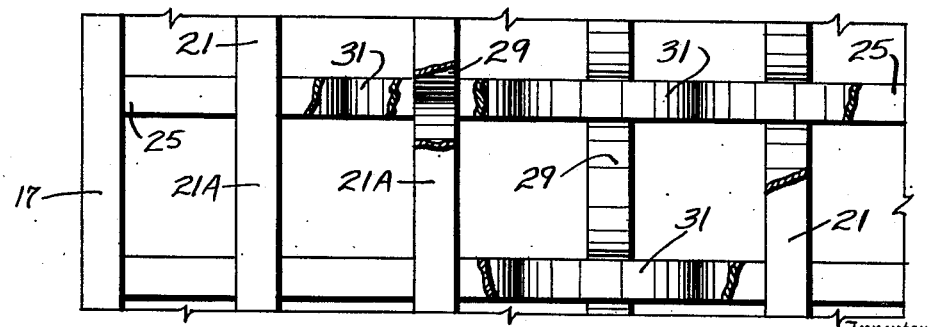

Patented Dec. 16, 1952

2,621,340

UNITED STATES PATENT OFFICE 2,621,340

SPRING ASSEMBLY

William P. Mogridge, Memphis, Tenn., assignor to Slumber Products Corporation, Memphis, Tenn., a corporation of Tennessee Application February 16, 1949, Serial No. 76,821

15 Claims. (Cl. 5—247)

This invention relates to certain new and useful improvements in spring assemblies, and is particularly adapted for such assemblies when used as spring filling of cushions, sofas and mattresses of the general character commonly known as inner spring, and may be adapted for use as bed spring assemblies in lieu of the conventional coil springs.

The invention principally resides in the employment of resilient spring rings which are arranged in a vertical position and alined in parallel rows which are intersected by similar rows at spaced intervals throughout their respective lengths.

There have been previous attempts to employ vertically disposed resilient rings in spring assemblies, particularly of the type used as bed springs, but such previous attempts have so arranged the rings and the members interconnecting the rings as to fail to take full advantage of the flexibility of arrangement and range of resiliency which is found in the arrangement of the present invention. Thus it has previously been thought necessary to arrange all of the vertically disposed rings in parallel relation and to provide internal stops limiting the compressibility of the rings and correspondingly and unsatisfactorily limiting the desirable flexibility of the units in use.

The principal object of the present invention is to provide a spring assembly which includes two groups of resilient rings in which all of the rings are substantially identical, are vertically disposed and are arranged in parallel rows, the rows of one group intersecting the rows of the other group.

A further object of the invention is to provide such an assembly in which the respective intersecting ring rows are each provided with an upper and lower band, the upper and lower bands of one group of rows intersecting the upper and lower bands of the other group of rows to form an upper and lower web by which the rings and rows are interconnected.

A further object of the invention is to provide such a spring assembly in which the respective rings of each row are alined with the upper and lower bands of that row.

A further object of the invention is to provide such a spring assembly in which the rings of each row are arranged in tangential abutment with adjacent rings of the row.

A further object of the invention is to provide such a spring assembly in which the vertically disposed rings are arranged at substantially equal intervals along the respective upper and lower bands.

A further object of the invention is to provide such a spring assembly in which the interval between rings is less than the length of the radius of a ring.

A further object of the invention is to provide such a spring assembly in which the intersecting upper bands and the intersecting lower bands are respectively attached at their points of intersection.

A further object of the invention is to provide such a spring assembly in which the points of intersection of the upper bands and of the lower bands are respectively intermediate the related rings.

And a further object of the invention is to generally improve the design, construction and efficiency of spring assemblies.

The means by which the foregoing and other objects of the present invention are accomplished and the manner of their accomplishment will readily be understood from the following specification upon reference to the accompanying drawings, in which:

Fig. 6 is a fragmentary sectional elevation taken as on the line VI—VI of Fig. 5.

Fig. 7 is a fragmentary sectional elevational view similar to Fig. 5, and taken as on the line IV—IV of Fig. 2.

Fig. 8 is a fragmentary sectional view taken as on the line VIII—VIII of Fig. 7.

Fig. 9 is a fragmentary sectional elevation illustrating on an enlarged scale one edge of the assembly as shown in Fig. 3.

Fig. 10 is a view similar to Fig. 9 of the variation of the invention illustrated in Figs. 2 and 4.

Fig. 11 is a similar view of a further variation in the arrangement of the invention; and Fig. 12 is a fragmentary plan view of the arrangement illustrated in Fig. 11 with certain parts broken away for purposes of illustration.

Figure 2:
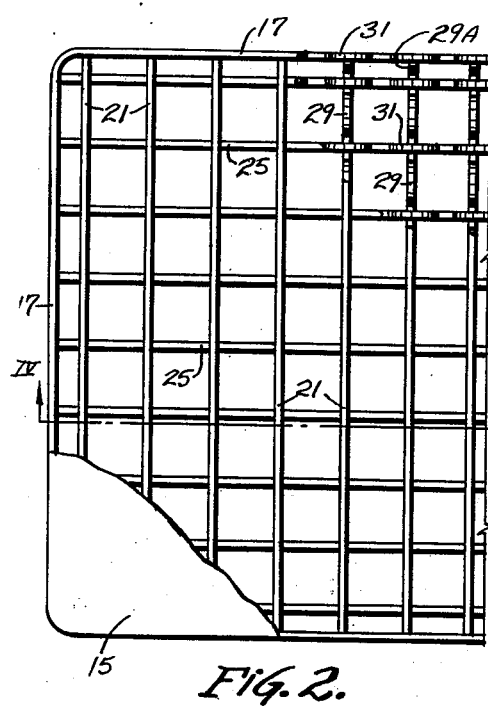
Fig. 2 is a view similar to Fig. 1 of a variation of the present invention.

Referring now to the drawings in which the various parts are indicated by numerals, it will be seen that the present invention is characterized by the positioning and arrangement of a plurality of vertically disposed spring rings which are preferably formed of strip-like flexible and resilient material, such as of spring steel, in circular or elliptical shape, and which are open and unobstructed interiorly. The rings are arranged in two groups with the rings of each group alined into rows of suitable length to fit within the confines of the spring assembly. The rows of one group are arranged in substantially parallel and equally spaced relation, and the rows of the other group are similarly arranged and the ring rows of the respective groups are brought into intersecting relationship.

It is preferred that the ring rows of one group should be disposed longitudinally of the spring assembly and that the ring rows of the other group should be disposed transversely thereof with the rows of the respective groups intersecting at right angles, and for purposes of illustration, the assembly has been shown herein in such arrangement. It will be understood that while the longitudinal and transverse positioning of the rows is preferred, they may be disposed diagonally and may intersect at an angle other than ninety degrees without departing herefrom.

As illustrated, the spring assembly of the present invention may be employed as the spring filler of an inner spring mattress which includes conventional upper and lower pads 15, or the spring assembly may be employed separately in box springs or otherwise as bed springs.

The spring assembly illustrated includes a peripheral upper rail 17 and a peripheral lower rail 19 which are each formed from resilient and flexible strip-like material, such as spring steel, and which are preferably of a gage similar to that employed in the formation of the spring rings. Each of the rails is preferably formed as an integral unit and respectively extends continuously along the sides and ends and around the corners of the top and bottom of the assembly.

The assembly further includes a plurality of longitudinal upper bands 21 and a like plurality of longitudinal lower bands 23, a plurality of transverse upper bands 25 and a like plurality of transverse lower bands 27. The bands 21, 23, 25, 27 are preferably formed from strip-like material substantially identical with that employed in the rails 17, 19. Vertically disposed between the upper bands 21 and the lower bands 23 are a plurality of vertically disposed spring rings 29 which are longitudinally alined and arranged in rows corresponding to the respective upper and lower bands 21, 23. The longitudinally alined rings 29 when positioned in the assembly are arranged respectively in register transversely of the assembly with the rings 29 of adjacent longitudinal rows. Vertically disposed between the upper bands 25 and the lower bands 27 is a plurality of spring rings 31 which are substantially identical with the rings 29 and which are arranged in alinement transversely of the assembly into rows corresponding with the respective upper and lower bands 25, 27. The rings 31 are further positioned respectively in register longitudinally of the assembly with the rings 31 of adjacent transverse rows.

In the manufacture of the illustrated spring assembly preferably a plurality of longitudinal units and a plurality of transverse units are fabricated. Each of the longitudinal units includes an upper band 21, a lower band 23 and several of the spring rings 29. The spring rings 29 are interposed between the bands so that the bands are in tangency with the respective and successive rings of each row or unit. Preferably the rings are positioned with their horizontal axes parallel to and lying in the same plane with the upper and lower bands 21, 23, and the rings are secured to the bands at their points of tangential contact with the bands, preferably by spot welding or in other suitable manner of rigid attachment.

With the rings thus in alinement with the bands, the points of attachment will be seen to be spaced apart along the bands, and as illustrated in Figs. 1 to 10, the proximate portions of the rings may additionally be spaced apart, such spacing between the proximate portions of adjacent rings being less than the length of the radius of a ring. It will thus be seen that the upper bands 21 and lower bands 23 each include attachment portions at the point of tangential contact with the related rings and intermediate portions 21A, 23A which are in vertical alinement and which respectively overlie and underlie the proximate portions of the adjacent rings. In similar manner the transverse units are fabricated from the transverse upper bands 25 and lower bands 27 and the transversely alined spring rings 31, the upper and lower bands 25, 27 being attached to the rings at their points of tangential contact and respectively including intermediate portions 25A, 27A overlying and underlying the proximate portions of adjacent rings 31.

After the units, which each include an upper band, a lower band and several spring rings, have been fabricated the spring assembly of this invention may be completed. One of the groups of units, as for example the longitudinal units, are positioned relative to the upper and lower rails 17, 19 and in the case of the longitudinal units are arranged to extend from end to end of the respective rails in substantial parallelism with the side portions of the respective rails. The units are arranged so that the spring rings 29 are transversely in register and the units are then spaced transversely apart, the amount of the transverse spacing being a distance substantially equal to the length of a spring ring diameter plus the length of the spacing between the proximate portions of adjacent rings 29 in the several units. The transversely spaced longitudinal units, with the rings 29 in transverse register, may then be secured to the opposite ends of the rails 17, 19, as by welding of the upper bands 21 to the upper rail 17 and the lower bands 23 to the lower rail 19.

It is found necessary in some instances, depending upon the size and arrangement of the assembly, to provide at one or both ends of each of the units a ring sector, such as the semi-circular sectors 29A, 31A. This provision is made for purposes of desired spacing, it frequently being desirable to have the longitudinal unit which is adjacent the side of the rails 17, 19 spaced from those rail portions less than the desired intermediate spacing between the successive units when positioned. Thus it will be seen, in Figs. 1 and 2, that the unit adjacent the side portion of the respective rails is spaced therefrom approximately half the spacing between the remaining and intermediate units.

With the longitudinal units positioned and attached to the upper and lower rails 17, 19 the transverse units are introduced to the assembly and are passed between the horizontally disposed upper and lower rails 17, 19, and are passed between the intermediate band portions 21A, 23A, consequently passing between the proximate portions of adjacent rings 29. The transverse units are positioned to extend from side to side of the assembly and are disposed parallel to the end portions of the rails 17, 19 with the respective rings 31 longitudinally in register. It will be seen that the transverse units are longitudinally spaced apart, this spacing being equal to the transverse spacing between the longitudinally disposed units.

In the form illustrated in Figs. 1, 3, 5 and 6, the transverse units are positioned so that the intermediate band portions 25A, 27A respectively underlie and overlie the intermediate portions 21A, 23A so that the points of intersection between the longitudinally disposed units and the transversely disposed units lie intermediate the points of attachment of adjacent rings of each unit. It is preferred that the upper bands 21, 25 be interconnected at their points of intersection, preferably by welding, although other suitable means of attachment may be employed. Similarly the lower bands 23, 27 are interconnected at their points of intersection.

The form illustrated in Figs. 2, 4, 7 and 8 varies from that illustrated and described previously in that the transverse units are positioned so that the successive rings 31 and the related upper and lower bands 25, 27 lie between the intermediate portions 21A, 23A of the upper and lower longitudinal bands, with the points of intersection between the upper bands 21 and 25 and between lower bands 23 and 27 substantially coinciding with the points of tangential contact between the rings 31 and the upper and lower bands 25, 27. As before, the upper bands 21, 25 are preferably interconnected at their points of intersection, as by welding, and similarly the lower bands 23, 27 are interconnected. It will be noted that in the form illustrated in Fig. 2, the longitudinally registered rings 31 are positioned in the space between the proximate portions of adjacent rings 29.

The variation illustrated in Figs. 11 and 12 differs from the previous arrangements in that the rings 29, 31 are there shown as arranged with their proximate portions substantially in abutment under normal conditions. In this latter arrangement the group of longitudinal units is positioned as before with the rings 29 in transverse register and with the units spaced transversely apart a distance substantially equal to the diameter of a ring. The intersecting transverse units are then introduced through the transversely registered openings of the longitudinally alined rings 29 and are secured in position with the intermediate band portions 25A, 27A in contact with the rings 29 substantially at the point of attachment of such rings 29 to the bands 21, 23. It will be noted that the points of abutment of the transversely alined rings 31 are substantially in vertical alinement with the points of contact and attachment of portions 25A, 27A to rings 29 and lie substantially centrally of the longitudinally alined rings 29.

When the spring assembly is subjected to vertical compression in use, the rings 29, 31 afford a yielding resilient support for the flexible upper bands 21, 25. As the spring rings are subjected to compression they are laterally bulged into substantially elliptical shape, as best illustrated in Figs. 5 to 8 inclusive. As the rings are thus deformed they come into abutment with the proximate portion of the next adjacent ring, which abutment suffices to prevent over-compression of individual rings and thereby insures against undesirable collapse thereof. Such abutment effects a cushioning and serves to bolster the rings and to stiffen them to resist further compression.

Figure 1:
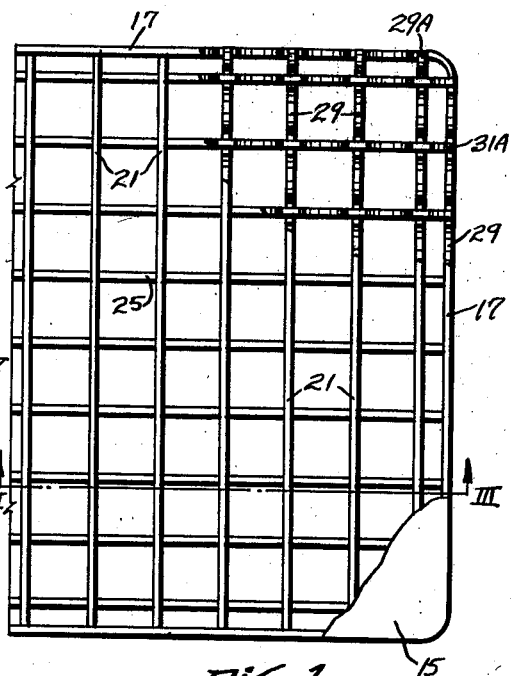
Fig. 1 is a fragmentary plan view of a spring filled mattress with certain portions broken away for purposes of illustration, showing a preferred form of the present invention.
Figure 4:
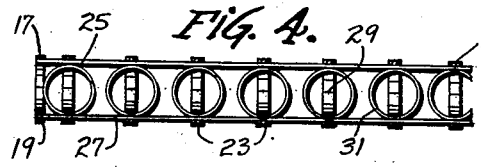
Fig. 4 is a sectional view on the line IV—IV of Fig. 2.
Figure 3:
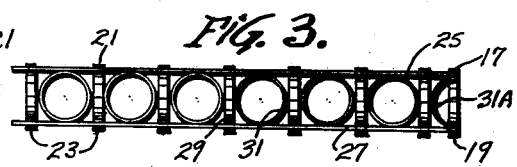
Fig. 3 is a sectional view on the line III—III of Fig. 1.
Figure 5:
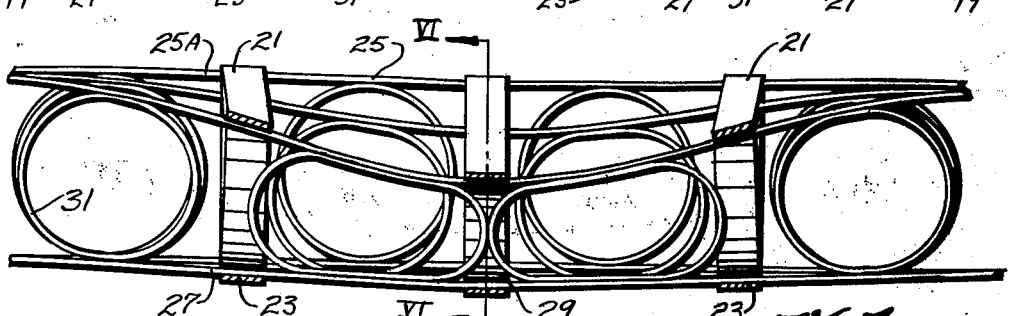
Fig. 5 is a fragmentary sectional elevation on an enlarged scale, taken as on the line III—III of Fig. 1, and illustrating the relation of the parts of the invention under compression.

It will be noted in the arrangement illustrated in Fig. 1 that the transversely alined rings 31 are shown as meeting under compression in the desired cushioning abutment and in such condition, as illustrated in Fig. 6, the longitudinally arranged rings 29 adjacent the point of major compression will come into abutment with the edge of the intersecting transversely alined rings 31. Obviously this condition may be reversed.

It will also be noted that the vertical compressive force by virtue of the interconnection effected between the rings by the upper bands 21, 25 is transferred to the neighboring rings adjacent the area of compression.

In the variation illustrated in Fig. 2, the longitudinally alined rings 29 under compression are brought into abutment, as illustrated in Fig. 7, these rings meeting centrally beneath the transverse rings 31 which are interposed in the space between the adjacent rings 29.

It is to be noted that, although the present invention has been described as a spring assembly fabricated from a plurality of similar units, it essentially comprises two groups of rings, each group being arranged in parallel rows and the rows of one group being disposed to intersect the rows of the other group. Interconnection between the ring rows is accomplished by an upper web consisting of the intersecting upper bands 21, 25 and by a lower web consisting of the intersecting lower bands 23, 27, and if desired, the assembly may be fabricated by assembling the respective webs independently and by interposing the alined and intersecting rows of spring rings therebetween with the respective elements being attached by welding, riveting or otherwise as desired.

It will also be understood that while the upper web has been illustrated with the upper bands 21 overlying the upper bands 25 the bands may be interwoven or the positions thereof reversed without departing herefrom, and the arrangement of the lower web similarly may be modified.

I claim:

1. A spring assembly which comprises two groups of vertically disposed resilient units, each unit consisting of horizontally disposed, flexible upper and lower bands and a plurality of vertically disposed resilient rings interposed and lying wholly between said bands in opposite tangential contact respectively with the lower and upper surfaces of said upper and lower bands, the horizontal axis of each said ring lying in the vertical plane of said bands, said rings being integrally attached to said bands at the points of said contact and equally spaced along said bands, the units of each group being arranged in spaced relation parallel to each other, the units of one said group being disposed longitudinally of said assembly and the units of the other said group being disposed transversely of said assembly, each longitudinally disposed unit being intersected at spaced intervals intermediate its length by said transverse units, said units being integrally interconnected at their points of intersection.

2. A spring assembly which comprises two groups of vertically disposed resilient units, each unit consisting of horizontally disposed flexible upper and lower bands and a plurality of vertically disposed resilient rings interposed between said bands in opposite tangential contact with said bands, the horizontal axis of each said ring lying in the vertical plane of said bands, said rings being attached to said bands at the points of said contact, the units of each group being arranged in spaced relation parallel to each other, the units of one said group being disposed longitudinally of said assembly and the units of the other said group being disposed transversely of said assembly, each longitudinally disposed unit being intersected intermediate its length by said transverse units, said units being interconnected at their points of intersection, said points of intersection being intermediate the respective said points of attachment of said rings to said bands.

3. A spring assembly in accordance with claim 2 in which the said rings of each unit are equally spaced apart along said bands.

4. A spring assembly in accordance with claim 2 in which each said ring of each unit is disposed in tangential abutment with the next adjacent ring of the unit.

5. A spring assembly which comprises a plurality of flexible, substantially parallel upper bands, and a plurality of flexible, substantially parallel lower bands, underlying said upper bands, a second plurality of upper and lower bands, respectively crossing the first said upper and lower bands; said bands being attached at their points of intersection; a plurality of resilient rings, between, spaced along and tangentially secured to said upper and said lower bands; said points of intersection of said bands being midway between the points of attachment of said rings.

6. A spring assembly which comprises a plurality of flexible, substantially parallel upper bands, and a plurality of flexible, substantially parallel lower bands, underlying said upper bands, a second plurality of upper and lower bands, respectively crossing the first said upper and lower bands; said bands being attached at their points of intersection; a plurality of resilient rings, between, along and tangentially secured to said upper and said lower bands; said points of intersection of said bands being intermediate the points of attachment of said rings.

7. A spring assembly which comprises a plurality of flexible, horizontally disposed, substantially parallel, upper bands, and a plurality of flexible, horizontally disposed, substantially parallel lower bands, vertically underlying said upper bands, a second plurality of upper bands and a second plurality of lower bands, respectively intersecting the first said upper and lower bands; said bands being attached to each other at their points of intersection; a plurality of resilient, vertically disposed rings, spaced along, between and tangentially secured to said upper and said lower bands; said points of intersection of said bands being midway between the points of attachment of said rings; a first group of said rings being in parallel rows and a second group of said rings being in parallel rows intersecting the rows of the first group, each ring within each said row being spaced from its adjacent ring a distance less than the radius of a said ring; each row being spaced from its adjacent, substantially parallel row, the spacing between rows being of a length not less that two ring radii and not more than three ring radii; whereby upon vertical compression of said spring assembly said rings become substantially elliptical, said spacing between said adjacent rings within a row is eliminated, said adjacent rings within a said row come into abutting juxtaposition and further compression of said spring assembly is resisted.

8. A spring assembly which comprises two groups of vertically disposed resilient units, each unit consisting of horizontally disposed flexible upper and lower bands and a plurality of vertically disposed resilient rings interposed between said bands in opposite tangential contact with said bands, the horizontal axis of each said ring lying in the vertical plane of said bands, said rings being attached to said bands at the points of said contact and equally spaced apart along said bands, said spacing being less than the length of a ring radius, the units of each group being arranged in spaced relation parallel to each other, the units of one said group being disposed longitudinally of said assembly and the units of the other said group being disposed transversely of said assembly, each longitudinally disposed unit being intersected at spaced intervals intermediate its length by said transverse units, said units being interconnected at their points of intersection, said points of intersection lying intermediate the respective said points of attachment of said rings to said bands.

9. A spring assembly which comprises two groups of vertically disposed resilient units, each unit consisting of horizontally disposed flexible upper and lower bands and a plurality of vertically disposed resilient rings interposed between said bands in opposite tangential contact with said bands, the horizontal axis of each said ring lying in the vertical plane of said bands, said rings being attached to said bands at the points of said contact and equally spaced apart along said bands, said spacing being less than the length of a ring radius, the units of each group being arranged in parallel spaced relation, the units of one said group being disposed longitudinally of said assembly and the units of the other said group being disposed transversely of said assembly, each longitudinally disposed unit being intersected at spaced intervals intermediate its length by said transverse units, said units being interconnected at their points of intersection, said points of intersection lying intermediate the respective points of attachment of the rings of one group to the bands of said group, and substantially coinciding with the points of attachment of the rings of the other said group to the bands of said other group.

10. A spring assembly which comprises two groups of vertically disposed resilient units, each unit consisting of horizontally disposed flexible upper and lower bands and a plurality of vertically disposed resilient rings interposed and lying wholly between said bands in opposite tangential contact respectively with the lower and upper surfaces of said upper and lower bands, the horizontal axis of each said ring lying in the vertical plane of said bands, said rings being attached to said bands at the points of said contact and equally spaced apart along said bands, said spacing being less than the length of a ring radius, the units of each group being arranged in parallel spaced relation, the units of one said group being disposed longitudinally of said assembly and the units of the other said group being disposed transversely of said assembly, each longitudinally disposed unit being intersected at spaced intervals intermediate its length by said transverse units, said units being integrally interconnected at their points of intersection.

11. A spring assembly which comprises two groups of vertically disposed resilient units, each unit consisting of horizontally disposed, flexible upper and lower bands and a plurality of vertically disposed resilient rings interposed and lying wholly between said bands in opposite tangential contact respectively with the lower and upper surfaces of said upper and lower bands, said rings being attached to said bands at the point of said contact, the units of each group being arranged in spaced relation parallel to each other, each unit of one said group being intersected at spaced intervals intermediate its length by units of the other said group, said units being interconnected at their points of intersection.

12. A spring assembly in accordance with claim 11 in which the rings of each unit are equally spaced apart along said bands.

13. A spring assembly in accordance with claim 11 in which the said points of intersection are disposed intermediate the said points of attachment of said rings to said bands.

14. A spring assembly in accordance with claim 11 in which the said points of intersection lie intermediate the respective points of attachment of the rings of one group to the bands of said group and substantially coincide with the points of attachment of the rings of the other said group to the bands of said other group.

15. A spring assembly in accordance with claim 11 in which each said ring of each unit is disposed in tangential abutment with the next adjacent ring of the unit.

WILLIAM P. MOGRIDGE.

REFERENCES CITED

The following references are of record in the file of this patent:

UNITED STATES PATENTS

| Number | Name | Date |
|---|---|---|
| 21,263 | Leavitt | Aug. 24, 1858 |
| 771,191 | Venable | Sept. 27, 1904 |
| 972,040 | Toth et al. | Oct. 4, 1910 |
| 1,329,145 | Seelig | Jan. 27, 1920 |
| 1,837,847 | Bowersox | Dec. 22, 1931 |
| 2,267,472 | Lieberman | Dec. 23, 1941 |
| 2,277,853 | Kohn | Mar. 31, 1942 |
| 2,503,333 | Gyles | Apr. 11, 1950 |

FOREIGN PATENTS

| Number | Country | Date |
|---|---|---|
| 574 | Great Britain | of 1877 |